United States Patent [19]
Wanmaker et al.

[11] 3,793,046
[45] Feb. 19, 1974

[54] METHOD OF MANUFACTURING A PIGMENT

[75] Inventors: Willem Lambertus Wanmaker; Johannes Gerardus Verriet, both of Emmasingel, Eindhoven, Netherlands

[73] Assignee: U.S. Philips Corporation, New York, N.Y.

[22] Filed: Dec. 6, 1971

[21] Appl. No.: 205,133

[30] Foreign Application Priority Data
Dec. 4, 1970 Netherlands .................. 7017716

[52] U.S. Cl. ............ 106/288 B, 106/306, 252/300, 313/109, 423/263, 423/593
[51] Int. Cl. ........ C09c 1/02, H01j 1/63, C09k 1/10
[58] Field of Search.. 106/306, 288 B; 423/263, 593

[56] References Cited
UNITED STATES PATENTS
3,174,822   3/1965   Borchardt ..................... 423/263
3,207,573   9/1965   Borchardt ..................... 423/593
3,437,432   4/1969   Borchardt ..................... 423/263

Primary Examiner—Delbert E. Gantz
Assistant Examiner—S. Berger
Attorney, Agent, or Firm—Frank R. Trifari

[57] ABSTRACT

A pigment manufactured by heating a mixture comprising $p$ mol % of BaO, $q$ mol % of $Y_2O_3$ and/or $La_2O_3$ and/or $Gd_2O_3$ and $r$ mol % of $MoO_3$ in which up to 75 mol % of BaO may be replaced by SrO, up to 25 mol % of BaO may be replaced by CaO and up to 75 mol % of $MoO_3$ may be replaced by $WO_3$.

The percentages $p$, $q$, and $r$ satisfy $r+5 \leq p$, $4 \leq q \leq 65$, $4 \leq r$ and $p+q+r = 100$.

The pigment comprises a compound defined by the formula $3(Ba_{1-x-y}Sr_xCa_y)O \cdot Ln_2O_3 \cdot (Mo_{1-z}W_z)O_3$.

Paramount use: blue absorbing layer in fluorescent lamps having a satisfactory color rendition.

3 Claims, 2 Drawing Figures

METHOD OF MANUFACTURING A PIGMENT

The invention relates to a method of manufacturing a pigment, particularly an inorganic yellow-coloured pigment. Furthermore the invention relates to such a pigment and to a low-pressure mercury vapour discharge lamp including such a pigment.

The present invention provides novel compounds which as a result of their physical and chemical properties can advantageously be used as a pigment having an unsaturated yellow colour, for example, in paints and lacquers. Furthermore an important use of such yellow pigments is found in low-pressure mercury vapour discharge lamps provided with a luminescent layer, also sometimes referred to as fluorescent lamps and this particularly fluorescent lamps having a satisfactory colour rendition.

To obtain a satisfactory rendition of the colours of articles irradiated by a fluorescent lamp it is necessary to suppress the intensity of the blue mercury lines emitted by the mercury vapour discharge at wave lengths of 405 and 436 nm.

To what extent this suppression is to be effected is dependent on the desired quality of the colour rendition and on the desired colour temperature of the lamp. An attenuation of the said blue mercury lines can be obtained if the wall of the lamp is provided with a layer which includes a light yellow coloured red luminescing material which absorbs at least a part of the blue mercury radiation. The emitted radiation of this luminescent material provides a desired contribution in the red part of the spectrum of the radiation emitted by the lamp. This known step is described in United Kingdom patent specification 737,828. Magnesium arsenate activated by quadrivalent manganese is used in practice as a blue absorbing red luminescing material. Furthermore the lamp includes a second luminescent layer which is provided on the absorption layer and which comprises one or more luminescent materials with which it is possible to achieve the desired spectral distribution of the radiation emitted by the lamp.

A drawback of the use of said arsenate in the blue absorbing layer of fluorescent lamps is that the layer must be comparatively thick so as to obtain the desired absorption. This gives rise to loss of light due to an inadmissibly high absorption of the radiation emitted by the second luminescent layer. A further drawback is that it is very difficult to maintain the layer thickness of the absorption layer constant during manufacture of the lamps so that fairly great differences may occur between the lamps themselves as regards both the percentage of blue and the percentage of red radiation.

The drawbacks described above may be partly obviated if the manganese content of magnesium arsenate is increased. In that case a stronger yellow coloured arsenate is obtained which better absorbs the blue mercury radiation so that thinner layers may be used. Furthermore the quantum efficiency of arsenate decreases so that the contribution of arsenate to the red radiation emitted by the lamp is only slight. The desired percentage of red radiation may then be obtained with other luminescent materials present in the lamp.

Furthermore it is known from United Kingdom patent specification 1,119,220 to add a given quantity of titanium dioxide to an absorption layer of fluorescent lamps containing manganese-activated magnesium arsenate in order to limit the quantity of ultraviolet radiation emitted by the lamp as much as possible. Due to the presence of the titanium dioxide which highly absorbs the ultraviolet radiation in the layer the quantity of the ultraviolet radiation generated by the discharge and reaching the arsenate will be smaller than in the case of a layer without titanium dioxide. As a result the contribution of arsenate to the red radiation emitted by the lamp is negligibly small. Such a layer comprising manganese-activated magnesium arsenate and titanium dioxide thus acts substantially exclusively as an absorption or filter layer. The material of such an absorption layer has a diffuse reflection for radiation at a wavelength of 400 nm which is still approximately 35 % whereas this reflection is only 80 to 85 % at a wavelength of 500 nm. It is evident that the known absorption layer is far from ideal in view of the requirements to be imposed, namely high absorption of ultraviolet and blue radiation and great permeability of the other visible radiation. One of the features of the invention is to give an improvement in this respect by providing a pigment with which it is possible to make absorption layers which satisfactorily meet the imposed requirements.

According to the invention a method of manufacturing a pigment is characterized in that a mixture is made comprising $p$ mol % of barium oxide, $q$ mol % of yttrium oxide and/or lanthanum oxide and/or gadolinium oxide and $r$ mol % of molybdenum oxide in which up to 75 mol % of barium oxide may be replaced by strontium oxide, up to 25 mol % of barium oxide may be replaced by calcium oxide and up to 75 mol % of molybdenum oxide may be replaced by tungsten oxide or comprising compounds which can produce said oxides, the molar percentages p, q and r satisfying the conditions $$r + 5 \leq p$$
$$4 \leq q \leq 65$$
$$4 \leq r$$
$$p + q + r = 100,$$

the mixture being reacted at an elevated temperature thereby forming a pigment which comprises a compound defined by the formula $3(Ba_{1-x-y}Sr_xCa_y)O \cdot Ln_2O_3 \cdot (Mo_{1-z}W_z)O_3$ in which formula Ln represents one or more of the elements yttrium, lanthanum and gadolinium and in which $0 \leq x \leq 0.75$, $0 \leq y \leq 0.25$ and $0 \leq z \leq 0.75$.

A pigment according to the invention has an unsaturated yellow colour. So far this colour could only be obtained by mixing one of the known deep yellow pigments with a white pigment. The pigments according to the invention have the further advantage that they can be readily dispensed in the conventional lacquers and that they have a satisfactory coating strength.

The reflection spectrum of the pigments according to the invention shows that these pigments have a high absorption for radiation at wavelengths up to approximately 440 nm and a low absorption for radiation at wavelengths of more than approximately 500 nm. When using the pigment in the absorption layer of a fluorescent lamp this leads to important advantages. In the first place layer thicknesses may be used which are thinner than those of the layers comprising the known arsenate and titanium dioxide so that loss of light as a result of absorption of radiation generated in the second luminescent layer is reduced to a minimum. In the second place titanium dioxide may be omitted in the absorption layer because the pigments according to the invention also satisfactorily absorb ultraviolet radiation. For providing the absorption layer it is thus unnecessary to have a suspension available which comprises more components. Such a suspension comprising more components generally leads to practical difficulties during processing. In the third place the pigments according to the invention, when used in fluorescent lamps, give rise to greater light outputs as a result of their low absorption of radiation at wavelengths of more than approximately 500 nm. Further advantages of the pigments according to the invention are that they can be readily dispersed in the suspension types commonly used for the manufacture of lamps, a satisfactory stability during lamp manufacture and a satisfactory photochemical stability during operation of the lamps.

All pigments according to the invention comprise a compound defined by the formula $3BaO.Ln_2O_3.MoO_3$ which can be shown with the aid of X-ray analysis. These compounds have not been previously described and have a cubic crystal structure and a characteristic X-ray diagram. It has been found that up to a maximum of 75 mol. % of barium oxide may be replaced by strontium oxide and up to a maximum of 25 mol % of barium oxide may be replaced by calcium oxide. Furthermore, up to a maximum of 75 mol. % of molybdenum oxide may be replaced by tungsten oxide. When these materials are replaced the properties of the pigment change to a slight extent only and the crystal structure is maintained. Replacement of larger quantities of calcium and tungsten oxide gives, however, rise to less satisfactorily usable pigments.

The pigments according to the invention are prepared by mixing the required oxides followed by a temperature treatment of the mixture. Mixing may be effected in the conventional manner. Furthermore it is alternatively possible to constitute compounds of the oxides to be used by means of coprecipitation. For obtaining the $3BaO.Ln_2O_3.MoO_3$ phase a temperature treatment is, however, always necessary. This temperature treatment may be effected for example, in a furnace for 2 to 20 hours at a temperature of between 800° and 1,400°C. Instead of the oxides of the said elements it is alternatively possible to use compounds in the starting mixture which can produce these oxides.

In the manufacture of a pigment according to the invention the quantities of the oxides to be used in the starting mixture need not correspond to the quantities determined by stoichiometry for the compound $3BaO.Ln_2O_3.MoO_3$. The molar percentages $p$, $q$ and $r$ of these oxides must, however, satisfy the imposed conditions because otherwise less satisfactory usable pigments and/or materials which do not comprise the $3BaO.Ln_2O_3.MoO_3$-phase are formed.

A method according to the invention is preferred in which the molar percentages $p$, $q$ and $r$ satisfy the conditions:

$$r + 20 \leq p$$
$$8 \leq q \leq 45$$
$$10 \leq r$$
$$p + q + r \leq 100$$

At these values of $p$, $q$ and $r$ pigments having optimum reflection properties are obtained.

Likewise as the known blue absorbing manganese-activated magnesium arsenate the pigments according to the invention can be used in fluorescent lamps having a satisfactory colour rendition as a separate absorption layer which is then coated by a second luminescent layer. The absorption layer may be provided in known manner with the aid of a suspension. As a result of the very satisfactory absorption properties of the pigments according to the invention it is furthermore possible to mix the pigments with the luminescent materials and to provide subsequently both materials in one layer on the envelope of the lamp. This has the advantage that the lamps can be manufactured more easily and that they do not show substantially any mutual differences in the intensity of the emitted blue radiation.

In order that the invention may be readily carried into effect it will now be described in detail by way of example with reference to some tables and a drawing.

In the drawing

EXAMPLE

A mixture was made of
0.6 mol $BaCO_3$
0.2 mol $Y_2O_3$
0.2 mol $MoO_3$

This mixture was heated in air in a furnace for 2 hours at a temperature of 1,200°C. After cooling of the firing product obtained it was pulverised and sieved. Subsequently the product was subjected to a second heat treatment in air for 2 hours at a temperature of 1,300°C. After cooling, pulverising and sieving the product was ready. It consists of a yellow pigment which, according to X-ray analysis, is found to comprise the compound $3BaO.Y_2O_3.MoO_3$.

Analogeously as described in the above-mentioned example, a large number of pigments according to the invention was manufactured. It was found that the heating period and temperature can be chosen within wide limits, for example, between 2 and 20 hours and between 800 and 1,400°C. Generally it is advantageous to perform the heat treatment in two or more stages, the firing products being pulverised and sieved between these stages.

Table I below states the diffuse reflection of radiation at given wavelengths in the range of from 380 to 700 nm in percents for a number of pigments according to the invention which comprise barium, yttrium and molybdenum oxide only. The examples included in the table are provided with numerals in the first column corresponding to the numerals given in FIG. 1. Thus for each example the molar ratio of the oxides present in the pigment can be determined with reference to FIG. 1. In the ternary system of FIG. 1 all pigments according to the invention are found in the range determined by the quadrangle ABCD. Example 1 relates to the $3BaO.Y_2O_3. MoO_3$ phase prepared from a stoichiometric firing mixture. It was found that considerable deviations from the stoichiometric ratio are possible while only slight differences in the reflection spectrum of the pigments obtained occur.

Figure 1:
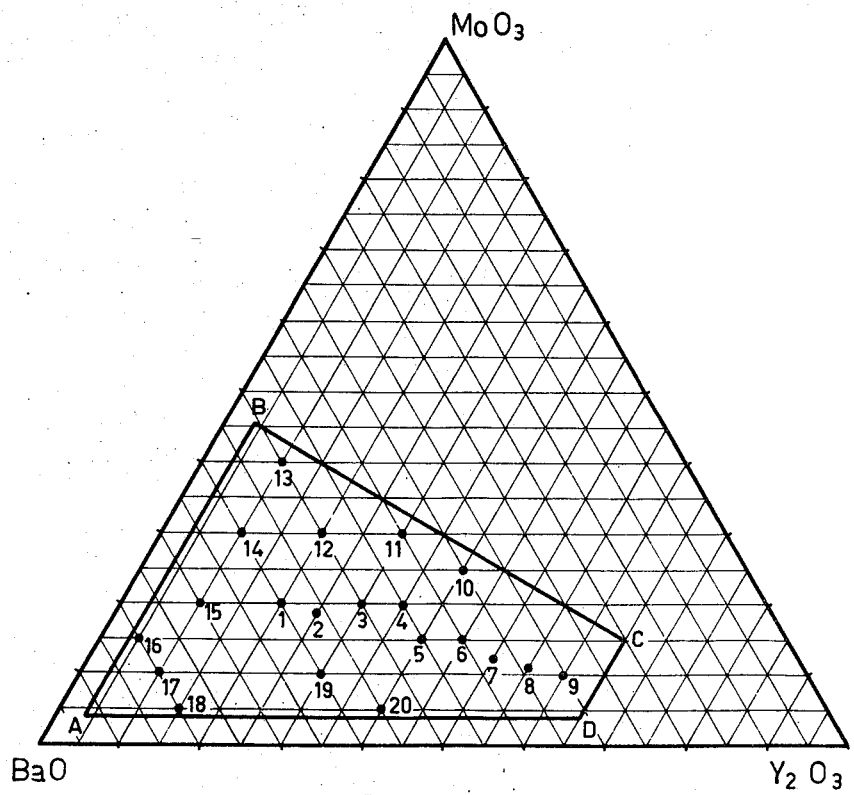
FIG. 1 shows the ternary system $BaO-MoO_3-Y_2O_3$. The composition of a number of pigments according to the invention is denoted by dots in FIG. 1.

TABLE I (see FIG. 1)

| Example | Diffuse reflection of ... nm radiation in % | | | | | | | | | | |
|---|---|---|---|---|---|---|---|---|---|---|---|
| | 380 | 400 | 420 | 440 | 460 | 480 | 500 | 550 | 600 | 650 | 700 |
| 1 | 2 | 2 | 5 | 16 | 39 | 63 | 71 | 77 | 79 | 81 | 82 |
| 2 | 3 | 3 | 6 | 18 | 47 | 69 | 76 | 80 | 81 | 83 | 85 |
| 3 | 4 | 6 | 10 | 26 | 57 | 77 | 86 | 90 | 89 | 89 | 90 |
| 4 | 6 | 7 | 13 | 30 | 61 | 80 | 88 | 91 | 93 | 93 | 93 |
| 5 | 5 | 7 | 14 | 33 | 63 | 77 | 82 | 86 | 86 | 86 | 86 |
| 6 | 5 | 7 | 14 | 36 | 66 | 83 | 89 | 91 | 91 | 91 | 91 |
| 7 | 7 | 9 | 18 | 40 | 69 | 82 | 86 | 89 | 88 | 88 | 88 |
| 8 | 8 | 11 | 22 | 45 | 71 | 83 | 86 | 89 | 89 | 89 | 88 |
| 9 | 10 | 14 | 25 | 48 | 74 | 85 | 88 | 90 | 90 | 90 | 89 |
| 10 | 14 | 17 | 26 | 47 | 74 | 86 | 91 | 93 | 93 | 94 | 94 |
| 11 | 12 | 15 | 23 | 43 | 69 | 82 | 86 | 89 | 91 | 91 | 92 |
| 12 | 5 | 6 | 11 | 25 | 54 | 76 | 84 | 89 | 92 | 92 | 92 |
| 13 | 8 | 9 | 16 | 33 | 62 | 78 | 84 | 89 | 91 | 92 | 92 |
| 14 | 6 | 8 | 14 | 29 | 55 | 72 | 77 | 81 | 83 | 85 | 86 |
| 15 | 4 | 5 | 10 | 27 | 55 | 73 | 79 | 83 | 85 | 86 | 87 |
| 16 | 9 | 11 | 18 | 33 | 57 | 74 | 80 | 83 | 84 | 83 | 83 |
| 17 | 10 | 12 | 20 | 36 | 63 | 79 | 86 | 88 | 88 | 86 | 86 |
| 18 | 10 | 14 | 24 | 44 | 69 | 83 | 87 | 89 | 90 | 90 | 90 |
| 19 | 4 | 6 | 13 | 32 | 60 | 74 | 79 | 83 | 85 | 87 | 89 |
| 20 | 11 | 13 | 21 | 41 | 68 | 79 | 83 | 87 | 88 | 89 | 91 |

Table II, likewise as table I, states the results of reflection measurements on pigments defined by the formula $3(Ba_{1-x-y}Sr_xCa_y)O.Y_2O_3.MoO_3$ manufactured from a stoichiometric firing mixture in which $x$ and $y$ have different values.

Molybdenum oxide in a pigment according to the invention may be replaced for up to 75 mol % by tungsten oxide. Table IV which states the results of measurements on pigments defined by the formula $3BaO.Y_2O_3.(Mo_{1-z}W_z)O_3$, shows that the satisfactory

TABLE II

| | | Diffuse reflection of ... nm radiation in % | | | | | | | | | | |
|---|---|---|---|---|---|---|---|---|---|---|---|---|
| x | y | 380 | 400 | 420 | 440 | 460 | 480 | 500 | 550 | 600 | 650 | 700 |
| — | — | 5 | 5 | 9 | 21 | 49 | 69 | 77 | 82 | 82 | 84 | 86 |
| 0.25 | — | 5 | 6 | 11 | 26 | 55 | 74 | 82 | 87 | 89 | 91 | 91 |
| 0.50 | — | 7 | 9 | 17 | 39 | 65 | 75 | 80 | 84 | 86 | 90 | 91 |
| 0.75 | — | 12 | 16 | 27 | 45 | 64 | 73 | 86 | 80 | 82 | 87 | 89 |
| — | 0.25 | 7 | 9 | 19 | 42 | 67 | 79 | 83 | 85 | 83 | 79 | 78 |

Reflection measurements on some pigments according to the invention which are defined by the formula $3BaO.Ln_2O_3.MoO_3$ and which are prepared from a stoichiometric firing mixture in which Ln represents one or more of the elements yttrium, gadolinium and lanthanum are summarized in table III below.

reflection properties are then maintained.

Figure 2:
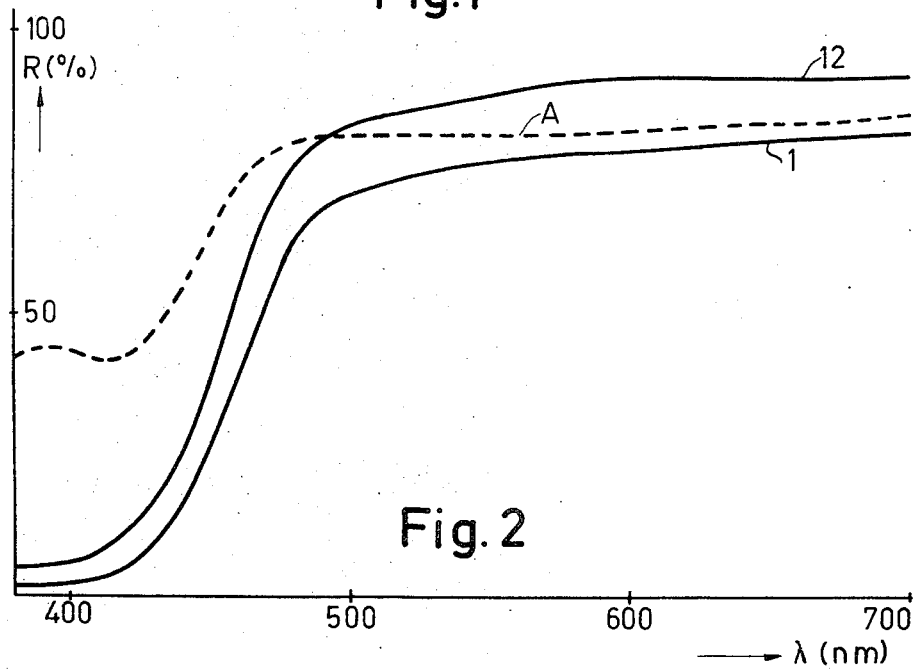
FIG. 2 shows the diffuse reflection spectrum of some pigments according to the invention.

In FIG. 2 of the drawing the curves 1 and 12 show the diffuse reflection spectrum of the pigments according to examples 1 and 12 from table I. The reflection R is vertically plotted in % and the wavelength λ of the incident radiation is horizontally plotted in nm. For the

TABLE III

| Ln in mol % | | | Diffuse reflection of ... nm radiation in % | | | | | | | | | | |
|---|---|---|---|---|---|---|---|---|---|---|---|---|---|
| Y | Gd | La | 380 | 400 | 420 | 440 | 460 | 480 | 500 | 550 | 600 | 650 | 700 |
| 100 | — | — | 5 | 5 | 9 | 21 | 49 | 69 | 77 | 82 | 82 | 84 | 86 |
| 50 | 50 | — | 6 | 7 | 10 | 19 | 42 | 62 | 73 | 78 | 79 | 83 | 85 |
| 25 | 75 | — | 5 | 5 | 7 | 13 | 34 | 55 | 69 | 76 | 79 | 82 | 86 |
| — | 100 | — | 5 | 5 | 6 | 12 | 30 | 52 | 66 | 75 | 78 | 82 | 86 |
| 75 | — | 25 | 4 | 4 | 7 | 19 | 41 | 61 | 68 | 76 | 78 | 80 | 84 |
| 50 | — | 50 | 4 | 4 | 7 | 20 | 46 | 66 | 74 | 80 | 82 | 83 | 87 |
| 25 | — | 75 | 5 | 5 | 10 | 23 | 49 | 64 | 71 | 75 | 79 | 81 | 85 |
| — | — | 100 | 12 | 17 | 30 | 52 | 72 | 76 | 78 | 82 | 84 | 87 | 88 |

TABLE IV

| | Diffuse reflection of ... nm radiation in % | | | | | | | | | | |
|---|---|---|---|---|---|---|---|---|---|---|---|
| z | 380 | 400 | 420 | 440 | 460 | 480 | 500 | 550 | 600 | 650 | 700 |
| 0.25 | 5 | 7 | 13 | 32 | 60 | 74 | 80 | 83 | 84 | 85 | 86 |
| 0.50 | 4 | 7 | 15 | 38 | 65 | 77 | 81 | 85 | 86 | 86 | 88 |
| 0.75 | 7 | 13 | 26 | 50 | 72 | 79 | 82 | 85 | 87 | 87 | 89 | purpose of comparison the broken-line curve A is included which represents the reflection of the known manganese-activated magnesium arsenate mixed with 10 % by weight of titanium dioxide. It is clearly evident that the pigments according to the invention in the wavelength range of below approximately 440 nm having a higher absorption than the known pigment. Furthermore many pigments according to the invention are found to have the advantage that they have a reflection at wavelengths of more than approximately 500 nm, which is higher than that of the known pigment.

What is claimed is:

1. A method of manufacturing a pigment of the formula $3(Ba_{1-x-y}Sr_xCa_y)O \cdot Ln_2O_3 \cdot (Mo_{1-z}W_z)O_3$ wherein $Ln$ is at least one element selected from the group consisting of yttrium, lanthanum and gadolinium, $0 \leq x \leq 0.75, 0 \leq y \leq 0.25$ and $0 \leq z \leq 0.75$ said method comprising forming a mixture of $p$ mol % of barium oxide, $q$ mol % of at least one compound selected from the group consisting yttrium oxide, lanthanum oxide and gadolinium oxide and $r$ mol % of molybdenum oxide, up to 75 mol % of barium oxide being replaceable by strontium oxide, up to 25 mol % of barium oxide being replaceable by calcium oxide and up to 75 mol % of molybdenum oxide being replaceable by tungsten oxide and any of said oxides being replaceable by compounds yielding said oxides and the molar percentages $p, q$ and $r$ satisfying the conditions:

$$r + 5 \leq p$$
$$4 \leq q \leq 65$$
$$4 \leq r \text{ and}$$
$$p + q + r = 100$$

and heating said mixture at a temperature between 800° and 1,400°C and thereby form said pigment.

2. A method as claimed in claim 1, characterized in that the molar percentages $p, q$ and $r$ satisfy $$r + 20 \leq p$$
$$8 \leq q \leq 45$$
$$10 \leq r$$
$$p + q + r = 100$$

3. A pigment comprising a mixed oxide defined by the formula $3(Ba_{1-x-y}Sr_xCa_y)O \cdot Ln_2O_3 \cdot (Mo_{1-z}W_z)O_3$, in which $Ln$ represents one or more of the elements yttrium, lanthanum and gadolinium and in which $0 \leq x \leq 0.75, 0 \leq y \leq 0.25$ and $0 \leq z \leq 0.75$.

* * * * *